United States Patent [19]

Saito

[11] Patent Number: 5,751,954
[45] Date of Patent: May 12, 1998

[54] ROUTER DEVICE AND DATA COMMUNICATION SYSTEM CAPABLE OF SUPPRESSING TRAFFIC INCREASE IN COMMUNICATIONS AMONG A PLURALITY OF LAN SEGMENTS

[75] Inventor: Shuichi Saito, Tokyo, Japan

[73] Assignee: NEC Corporation, Tokyo, Japan

[21] Appl. No.: 767,504

[22] Filed: Dec. 16, 1996

Related U.S. Application Data

[63] Continuation of Ser. No. 35,268, Mar. 22, 1993, abandoned.

[30] Foreign Application Priority Data

Mar. 23, 1992 [JP] Japan .................. 4-065152

[51] Int. Cl.$^6$ .................................................. G06F 15/56
[52] U.S. Cl. .................. 395/200.15; 395/200.02
[58] Field of Search ............... 395/200.1, 200.15, 395/200.02; 370/400, 402

[56] References Cited

U.S. PATENT DOCUMENTS

| | | | |
|---|---|---|---|
| 4,975,906 | 12/1990 | Takiyasu et al. | 370/85.13 |
| 5,018,133 | 5/1991 | Tsukakoshi et al. | 370/16 |
| 5,095,480 | 3/1992 | Fenner | 370/94.1 |
| 5,111,453 | 5/1992 | Morrow | 370/85.13 |
| 5,144,622 | 9/1992 | Takiyasu et al. | 370/85.13 |
| 5,179,555 | 1/1993 | Videlock et al. | 370/85.13 |
| 5,214,646 | 5/1993 | Yacoby | 370/85.14 |
| 5,280,480 | 1/1994 | Pitt et al. | 370/85.13 |
| 5,309,437 | 5/1994 | Perlman et al. | 370/85.13 |
| 5,351,237 | 9/1994 | Shinohara et al. | 370/58.3 |

*Primary Examiner*—Robert B. Harrell
*Assistant Examiner*—Zarni Maung
*Attorney, Agent, or Firm*—Foley & Lardner

[57] ABSTRACT

In a router device of the present invention, the routing controller refers to the routing address table to determine whether the received frame is to be routed (whether the frame passes through two or more router devices, for example). The multiplication controller multiplies the frame selected as the subject of routing and has the path controller set paths between router devices for transmission of the multiplied frames. The frame for which a path is set is transmitted with the destination address of the router device as the other party of communication. When a multiplied frame is received, the multiplication controller extracts an ordinary frame from the multiplied frame and sends it to the device indicated by the original destination address.

17 Claims, 19 Drawing Sheets

FIG. 13A

ADDRESS TABLE 107

ROUTER DEVICE 10

| ORIGINATING ADDRESS | DESTINATION ADDRESS |
|---|---|
| DEVICE 60 | DEVICE 70, 80, 90 |
| DEVICE 70 | DEVICE 60 |
| DEVICE 80 | DEVICE 60 |
| ROUTER DEVICE 20 | ROUTER DEVICE 10 |

FIG. 13B

ROUTER DEVICE 20

| ORIGINATING ADDRESS | DESTINATION ADDRESS |
|---|---|
| DEVICE 90 | DEVICE 60, 70, 80 |
| DEVICE 70 | DEVICE 60 |
| DEVICE 80 | DEVICE 60 |
| ROUTER DEVICE 10 | ROUTER DEVICE 20 |

FIG. 13C

ROUTING ADDRESS TABLE 108

ROUTER DEVICE 10

| ORIGINATING ADDRESS | DESTINATION ADDRESS |
|---|---|
| DEVICE 60 | DEVICE 90 |
| DEVICE 90 | DEVICE 60 |

FIG. 13D

ROUTER DEVICE 20

| ORIGINATING ADDRESS | DESTINATION ADDRESS |
|---|---|
| DEVICE 60 | DEVICE 90 |
| DEVICE 90 | DEVICE 60 |

ROUTER DEVICE AND DATA COMMUNICATION SYSTEM CAPABLE OF SUPPRESSING TRAFFIC INCREASE IN COMMUNICATIONS AMONG A PLURALITY OF LAN SEGMENTS

This application is a continuation of application Ser. No. 08/035,268, filed Mar. 22, 1993, now abandoned.

BACKGROUNDS OF THE INVENTION

1. Field of the Invention

The present invention relates to a digital communication system and particularly relates to a router device for mutual communications among a plurality of LAN segments.

2. Description of the Prior Art

A conventional router device installed among three LAN segments has a filter function. It compares data signals from a plurality of information processors connected to the two LAN segments for which the local router is in charge of relay with the addresses set in the address table of the local router so as to pass the matching data signals to the other LAN segment but reject sending or receiving of those having an address not set in the address table between LAN segments. With this filter function, the router device distinguishes the data signals to be processed within the LAN segment from those to be processed in cooperation with other LAN segments. For the signals to be processed in cooperation with other LAN segments, it relays their addresses.

In such a router device, however, if three LAN segments are connected in a communication system, data transmission between the information processor connected to the first LAN segment and another information processor connected to the third LAN segment raises traffic at the second LAN segment located therebetween, which results in lower efficiency of the entire network due to the bottleneck at the second LAN segment. Further, data delay or incapability of data transmission may occur due to data congestion at the second LAN segment in data transmission between the information processor connected to the second LAN segment and another information processor connected to one of the other LAN segments.

SUMMARY OF THE INVENTION

An object of the present invention is to provide a router device and a data communication system which, in communications among a plurality of LAN segments in connection, suppress traffic increase at the LAN segment as a relay by controlling the data transmission amount corresponding to the traffic amount at this relaying LAN segment and thereby prevent lowering of efficiency of the entire network due to a bottleneck condition at the relaying LAN segment.

Another object of the present invention is to provide a router device and a data communication system which solve the problems of data delay and data transmission incapability due to congestion at the LAN segment as a relay in data sending/receiving among information processors connected to the relaying LAN segment.

According to an embodiment of the present invention to attain the above objects, a router device connected between different LAN segments for mutual communications between them comprises a data sending/receiving control means which receives data signals on the LAN segment and sends data signal to the LAN segment, a link address detection means which selects the data signals treated as the subject of receiving from the data signals received at the data sending/receiving control means, a routing control means which selects the data signals treated as the subject of routing from the data signals selected by the link address detection means, a multiplication control means which multiplies the data signals selected by the routing control means, a path control means which sets paths for the data signals multiplied by the multiplication control means and issues request for data signal sending and a link address setting means which, based on the sending request from the path control means, sets the destination address to the multiplied data signal to send it to the data sending/receiving control means.

According to a further preferred embodiment, a router device further comprises an address table where destination addresses and originating addresses of the data signals to be received are registered in advance and the link address detection means selects the data signals treated as the subject of receiving from the received data signals with reference to the address table. A router also comprises a routing address table where the destination address and the originating address of the data signals to be multiplied and transmitted are registered in advance and the routing control means selects the data signals treated as the subject of routing with reference to the routing address table.

According to a still another preferred embodiment, the routing control means of a router comprises a means which, after the routing control means judges whether the destination address of a data signal other than those to be routed matches with its own address, notifies the multiplication control means that the data signal has been multiplied in case of matching and issues a sending request to the link address setting means in case of unmatching, and the multiplication control means comprises a means which, upon receipt of notice from the routing control means for a multiplied data signal, extracts the original data signals from the multiplied data signals and issues to the link address setting means a sending request for the extracted data signals. Further, the path control means comprises a means to set a single path or a plurality of paths corresponding to the amount of the multiplied data signals.

According to another preferred embodiment, a data communication system of the present invention comprises at least three LAN segments and a router device connected among the LAN segments for mutual communications among the LAN segments, and the router device further comprises a data sending/receiving control means which receives data signals on the LAN segment and sends data signal to the LAN segment, a link address detection means which selects the data signals treated as the subject of receiving from the data signals received at the data sending/receiving control means, a routing control means which selects the data signals treated as the subject of routing from the data signals selected by the link address detection means, a multiplication control means which multiplies the data signals selected by the routing control means, a path control means which sets paths for the data signals multiplied by the multiplication control means and issues, request for data signal sending and a link address setting means which, based on the sending request from the path control means, sets the destination address to the multiplied data signal to send it to the data sending/receiving control means.

According to a further preferred embodiment, a data communication system further comprises an address table where destination addresses and originating addresses of the data signals to be received are registered in advance, and the link address detection means selects the data signals treated as the subject of receiving from the received data signals with reference to the address table. It also comprises a routing address table where the destination address and the originating address of the data signals to be multiplied and transmitted are registered in advance, wherein the routing control means selects the data signals treated as the subject of routing with reference to the routing address table.

According to a still another preferred embodiment, the routing control means comprises a means which, after the routing control means judges whether the destination address of a data signal other than those to be routed matches with its own address, notifies the multiplication control means that the data signal has been multiplied in case of matching and issues a sending request to the link address setting means in case of unmatching, and the multiplication control means comprises a means which, upon receipt of notice from the routing control means for a multiplied data signal, extracts the original data signals from the multiplied data signals and issues to the link address setting means a sending request for the extracted data signals. Further, the path control means comprises a means to set a single path or a plurality of paths corresponding to the amount of the multiplied data signals.

Other objects, characteristics and effects of the present invention will be clarified in the detailed description below.

BRIEF DESCRIPTION OF THE DRAWINGS

FIGS. 13A, 13B, 13C, and 13D diagrams to show example of address tables and routing address tables;

DESCRIPTION OF THE PREFERRED EMBODIMENT

Referring to the attached figures, preferred embodiments of the present invention will be explained in detail below.

Figure 1:
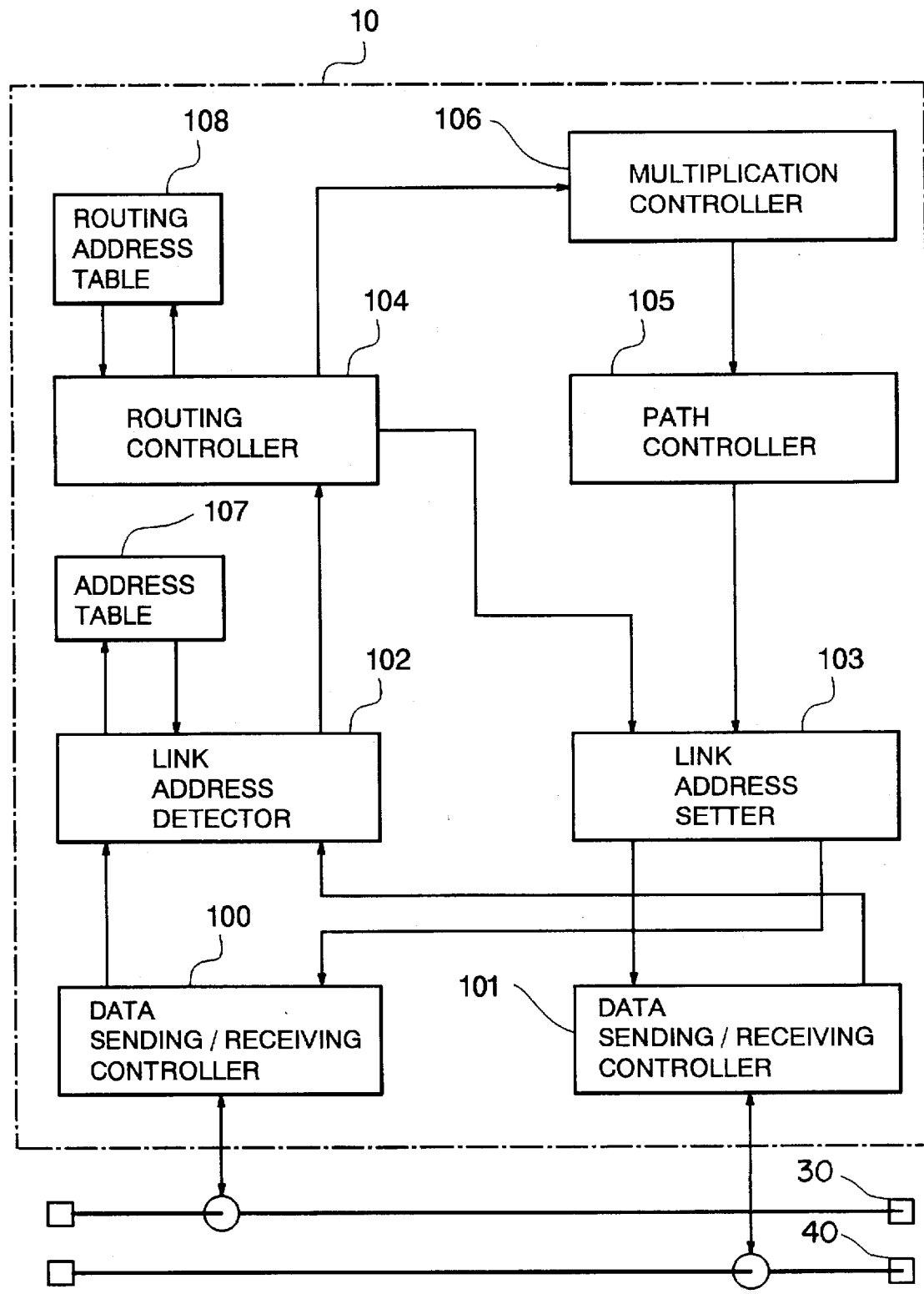
FIG. 1 is a block diagram to show the configuration of a preferred embodiment of a router device according to the present invention.

FIG. 1 shows the configuration of a preferred embodiment of a router device according to the present invention.

Figure 2:
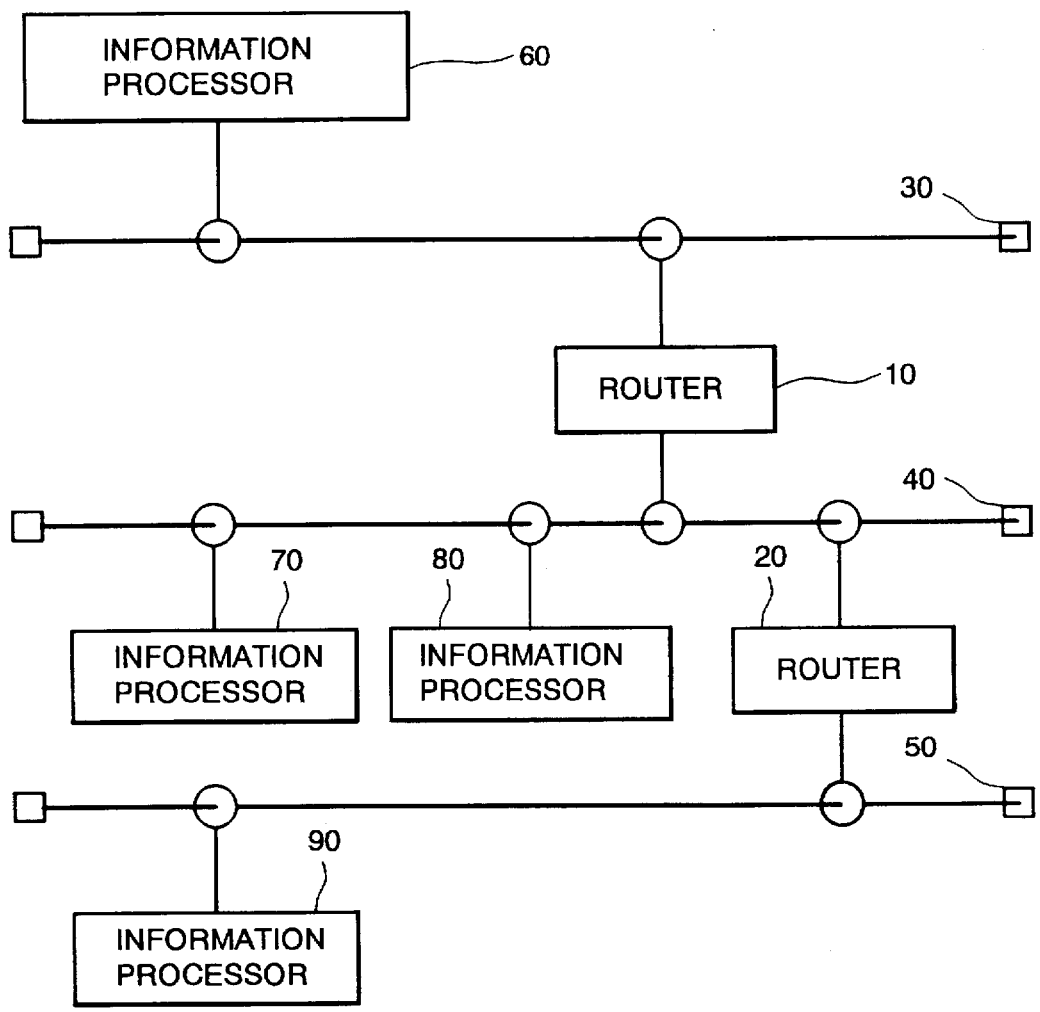
FIG. 2 is a diagram to show an embodiment of a data communication system according to the present invention.

FIG. 2 shows the entire configuration of a data communication system to which the present invention is applied. In the figure, a data communication system is provided with three LAN segments 30, 40 and 50. The LAN segment 30 is connected with an information processor 60 such as a workstation, the LAN segment 40 is connected with two information processors 70 and 80 and the LAN segment 50 is connected with an information processor 90. Between the LAN segments 30 and 40 and between the LAN segments 40 and 50, router devices 10 and 20 are provided in order for mutual communications among the LAN segments 30, 40 and 50.

In the configuration of FIG. 2, data can be transmitted between the information processor 60 on the LAN segment 30 and the information processor 90 on the LAN segment 50 through sending and receiving of data via the router devices 10 and 20. Similarly, data communications between the information processor 60 and the information processor 70 or 80 on the LAN segment 40 can be realized via the router device 10. Data can be transmitted between the information processor 70 or 80 on the LAN segment 40 and the information processor 90 on the LAN segment 50 via the router device 20. The router devices 10 and 20 according to the present invention serves for prevention or reduction of incapability or delay of data sending/receiving at the information processors 70 and 80 due to increased traffic at the LAN segment 40 in such data communications.

FIG. 1 is a block diagram to show the configuration of a router device 10 according to a preferred embodiment of the present invention. Though FIG. 1 shows the configuration of the router device 10 provided between the LAN segments 30 and 40 only, the router device 20 provided between the LAN segments 40 and 50 has exactly the same configuration as this device.

The router device 10 comprises data sending/receiving controllers 100 and 101, a link address detector 102, a link address setter 103, a routing controller 104, a path controller 105, a multiplication controller 106, an address table 107 and a routing address table 108.

The data sending/receiving controller 100 serves for receiving of data signals in transmission for the LAN segment 30 and sending of data signals to the LAN segment 30. Similarly, the data sending/receiving controller 101 serves for receiving of data signals in transmission for the LAN segment 40 and sending of data signals to the LAN segment 40. The data sending/receiving controllers 100 and 101 of the router device 20 serve for receiving and sending of data signals for the LAN segments 40 and 50, respectively.

The link address detector 102 refers to the address table 107 (described later) and extracts the data signals to be received by the router device 10 from the data signals received at the data sending/receiving controllers 100 and 101.

The link address setter 103 adds a destination address and an originating address to the data signals extracted by the link address detector 102. The link address setter 103 also returns the data other than subject of routing to the original data sending/receiving controller 100 or 101.

The routing controller 104 refers to the routing address table 108 (described later) and extracts the data signals to be routed from those extracted by the link address detector 102. The routing controller 104 also sends the data other than those to be routed to the link address setter 103 as a result of reference to the routing address table 108.

The path controller 105 sets paths for data signals multiplied by multiplication controller 106 and sends them to the link address setter 103. The path controller 105 sets a single or a plurality of paths corresponding to the amount of data to be transmitted.

The multiplication controller 106 multiplies a plurality of data signals extracted by the routing controller 104 and disassembles any received multiplied frames so as to obtain ordinary frames.

Figure 3:
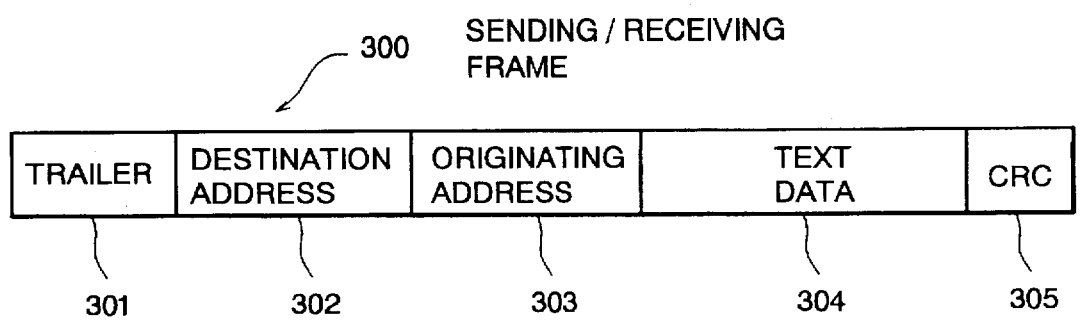
FIG. 3 is a diagram to show the configuration of a frame sent or received by the data communication system in FIG. 2.

FIG. 3 shows an example of a data signal frame sent or received in the data communication system of FIG. 2. This transmission frame is a data format of a logical signal sent or received by the information processors 60 to 90 and router devices 10 and 20. The frame 300 comprises a trailer 301, a destination address 302, an originating address 303, text data 304 as the information to be transmitted, and CRC (Cyclic Redundancy Check) information 305. The trailer 301 is a fixed signal string with certain intervals for detection of frame starting. The destination address 302 is the address of the device which receives the data. The originating address 303 is the address of the device which transmits the data. The CRC information 305 is a redundant data for correctness checking of the frame 300.

FIGS. 13A and 13B show the contents of the address table 107 of the router devices 10 and 20 in the data communication system of FIG. 2. FIG. 13A shows the address table 107 for the router device 10 and FIG. 13B shows the address table 107 for the router device 20. The contents of the address table 107 depends on the configuration of devices connected to the LAN segments 30 to 50.

FIGS. 13C and 13D show the contents of the routing address table 108 with registration of the addresses for the information processors 60 to 90 which make path routing via paths arranged between the router devices 10 and 20. FIG. 13C is for the routing address table 108 of the router device 10 and FIG. 13D is for the routing address table 108 of the router device 20. The contents of the routing address table 108 also depends on the configuration of devices connected to the LAN segments 30 to 50.

Figure 4:
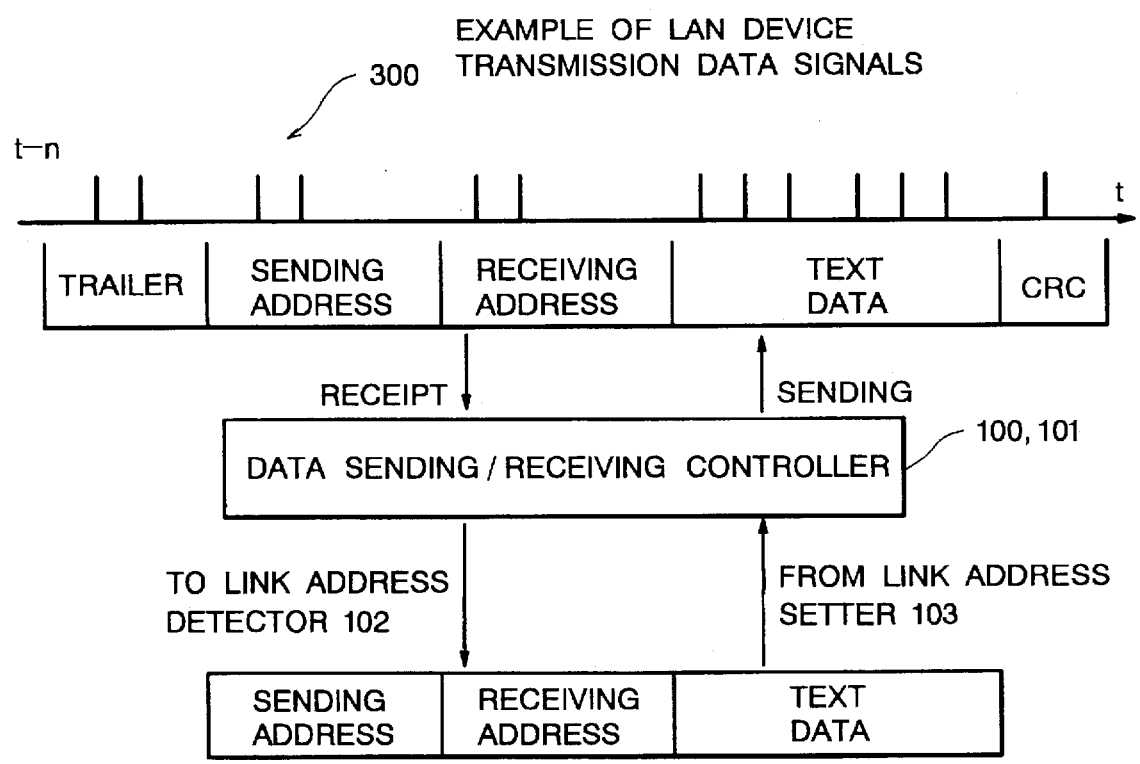
FIG. 4 is a diagram to show the outline of processing by the data sending/receiving controller.

FIG. 4 shows the outline of sending/receiving processing at the data sending/receiving controllers 100 and 101. As shown in the figure, the data sending/receiving controller 100 or 101 receives the frame 300 flowing on the LAN segment 30, 40 or 50 and sends the destination address 301, the originating address 302 and the text data 304 to the link address detector 102. It also adds the trailer 301 and the CRC information 305 to the destination address 302, the originating address 303 and the text data 304 sent from the link address setter 103 so as to make the frame 300 as shown in FIG. 3 and sends it to the LAN segment 30, 40 or 50.

Figure 5A:
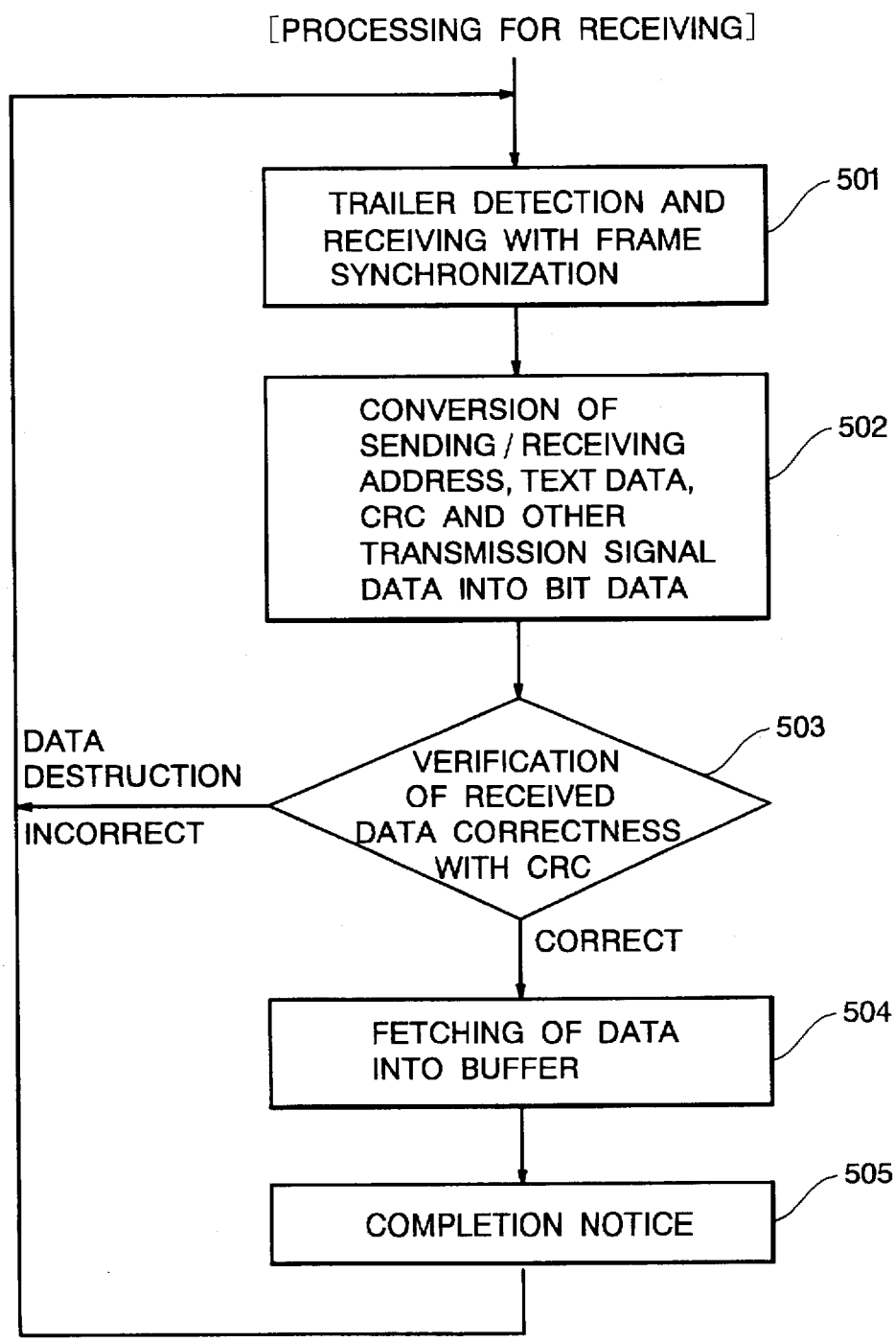
FIGS. 5A and 5B are flowcharts to illustrate the processing for receiving and sending at the data sending/receiving controller.
Figure 5B:
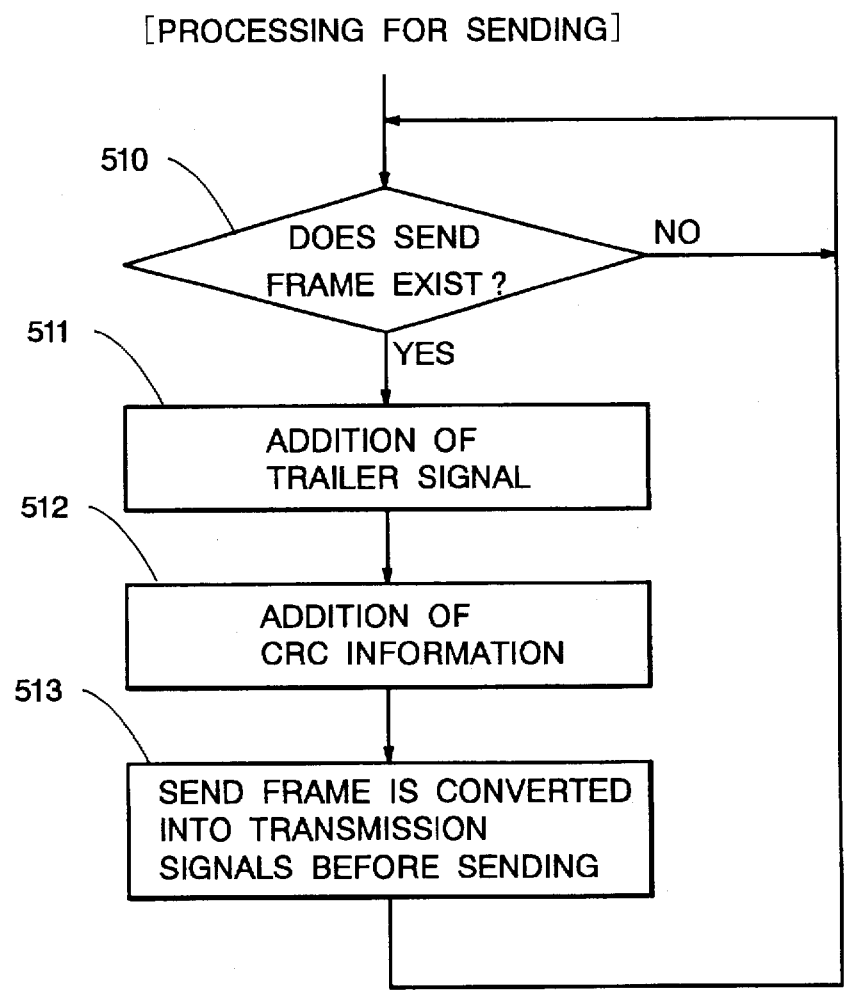

FIGS. 5A and 5B are flowcharts illustrating the sending and receiving processing at the above data rending/receiving controllers 100 and 101. Referring to FIG. 5A for receiving processing, the controller detects the trailer 301 in the frame 300 flowing on the LAN segment 30, 40 or 50 and receives the frame 300 with ensuring synchronization (Step 501). Then, it converts the destination address 302, the originating address 303, the text data 304 and the CRC information 305 received following the trailer 301 into bit data (Step 502). At this point, the data signals are subjected to bit checking based on the received CRC information 305 so as to verify the correctness of the data signals (Step 503). If the received frame 300 is correct, then the destination address 302, the originating address 303 and the text data 304 of the frame 300 are stored in the buffer (Step 504). If the received frame 300 is incorrect, then the received data is destroyed. Upon completion of data signal storing to the buffer, completion of receipt is notified to the link address detector 102 (Step 505).

Referring to FIG. 5B for sending processing, the data sending/receiving controller 100 or 101, upon request for sending from the link address setter 103, checks whether it has data signals (destination address 302, originating address 303 and text data 304) to be sent in its own buffer (Step 510). If not, the controller waits for another sending request. If it has data signals to be sent, it adds the trailer 301 to those data signals (Step 511). Then it adds the CRC information 305 to those data signals (Step 512). This results in composition of the frame 300. Then, it converts thus composed frame 300 into transmission signals and, after checking that there are no other data signals on the LAN segment 30, 40 or 50, transmits the frame 300 (Step 513).

Figure 6:
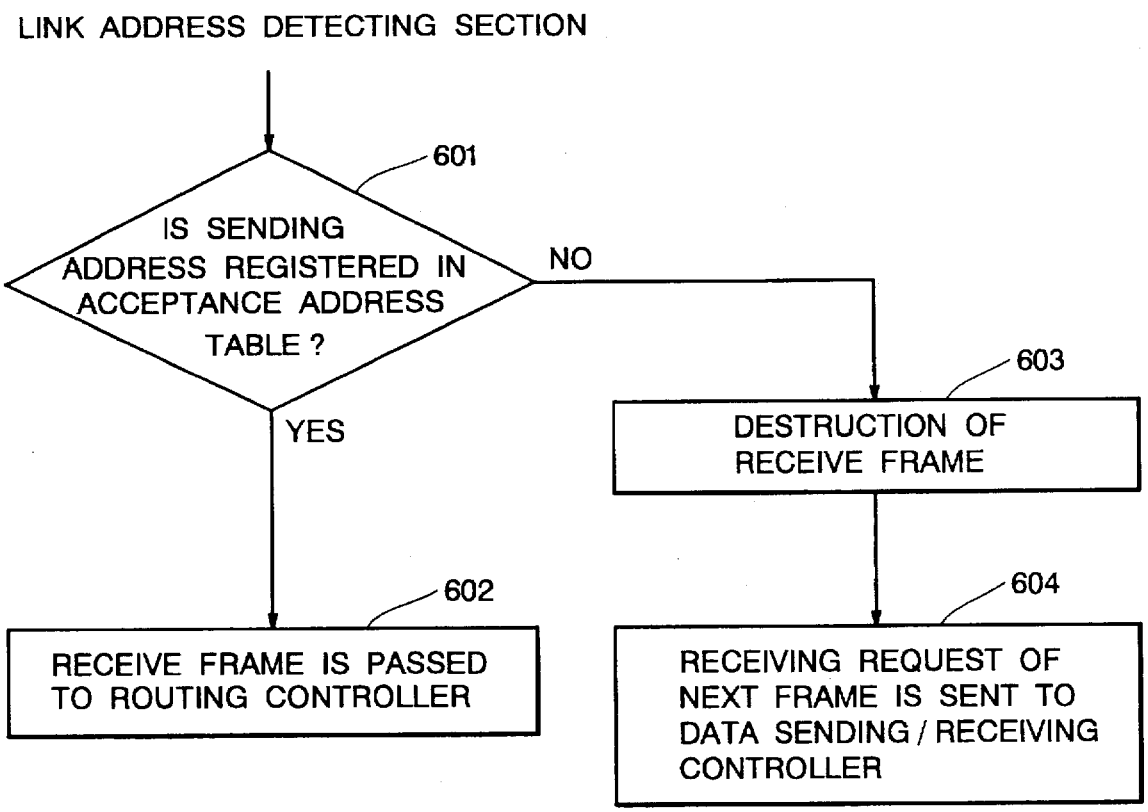
FIG. 6 is a flowchart to illustrate the processing by the link address detector.

Referring to the flowchart of FIG. 6, the processing at the link address detector 102 is described now. Upon receipt completion notice from the data sending/receiving controller 100 or 101, the link address detector 102 judges whether the destination address 302 in the frame 300 received by the sending/receiving controller 100 or 101 is registered in the address table 107 (Step 601). If the destination address 302 in the frame 300 is registered in the address table 107, the link address detector 102 notifies the routing controller 104 of the fact that this frame 300 is subject of receipt and reads out those data signals from the buffer at the data sending/receiving controller 100 or 101 for transfer to the buffer in the routing controller 104 (Step 602).

If the destination address 302 of the frame 300 is not registered in the address table 107, then the link address detector 102 sends a request to ask the data sending/receiving controller 100 or 101 to destroy the received frame 300 (Step 603) and another request to wait for the next frame receiving (Step 604).

Figure 7:
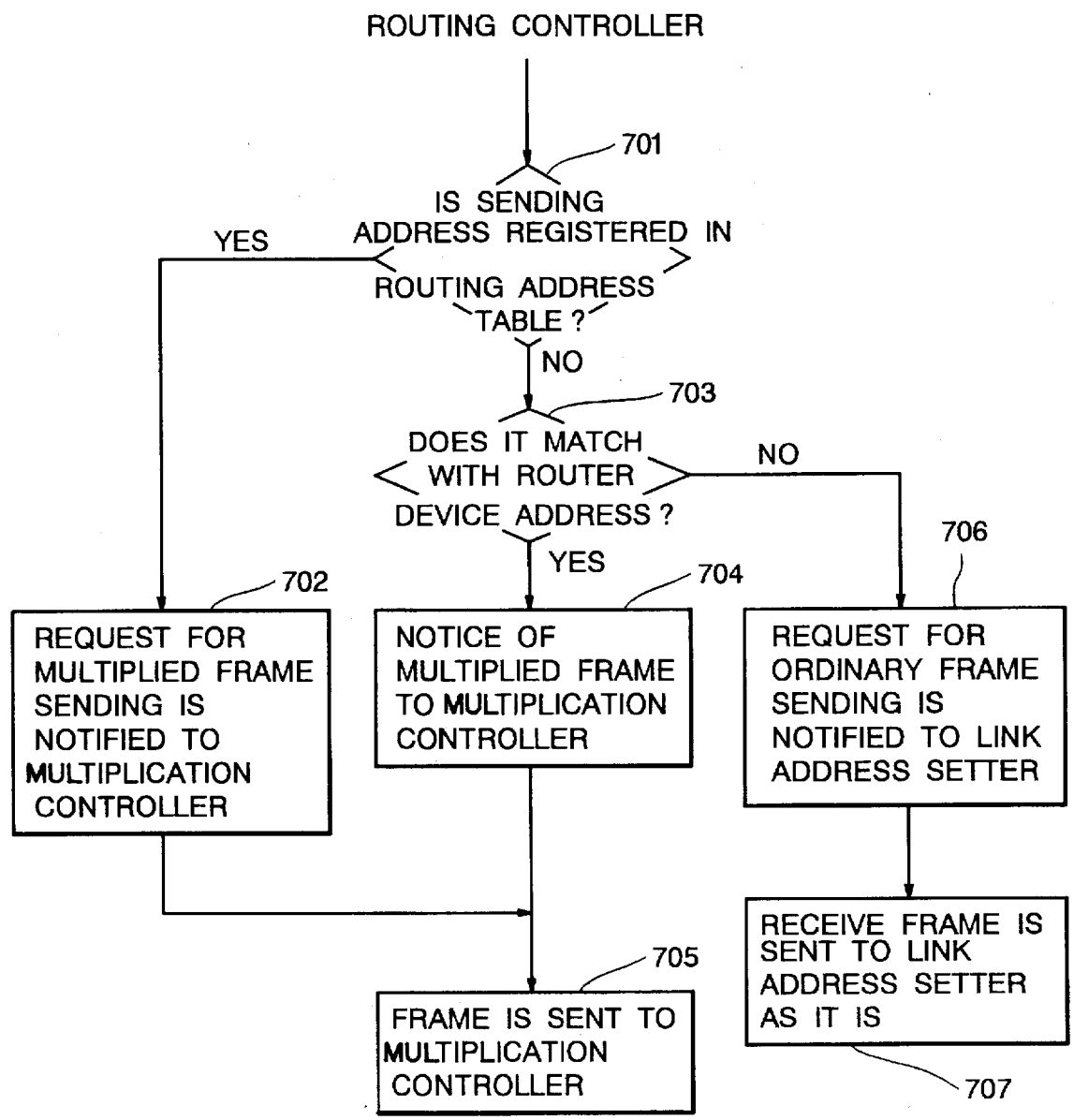
FIG. 7 is a flowchart to illustrate the processing by the routing controller.

Referring now to the flowchart of FIG. 7, the routing controller 104 refers to the routing address table 108 and checks whether the combination of the destination address and the originating address received from the link address detector 102 is registered in the routing address table 108 (Step 701).

If the combination of the destination address and the originating address in the received frame is registered in the routing address table 108, then the routing controller 104 issues a received frame sending request to the multiplication controller 106 (Step 702) and transfers the received frame to the multiplication controller 106 (Step 705).

If the combination of the destination address and the originating address in the received frame is not registered in the routing address table 108, then the routing controller 104 judges whether the destination address in the send frame matches with the address of the router device 10 or 20 which received the frame (Step 703). If it matches, the routing controller 104 notifies the multiplication controller 106 that a multiplied frame is received (Step 704) and transfers the received frame to the multiplication controller 106 (Step 705).

If unmatched in Step 703, the routing controller 104 issues an ordinary frame sending request to the link address setter 103 (Step 706) and transfers the received frame to the link address setter 103 (Step 707).

The routing controller 104 is provided with a plurality of buffers. Any data in such buffers can be multiplied. Even when data traffic is not so much congested and only one of the buffers has data, which means that multiplication with other data is impossible, the processing is made in the same way.

Figure 8:
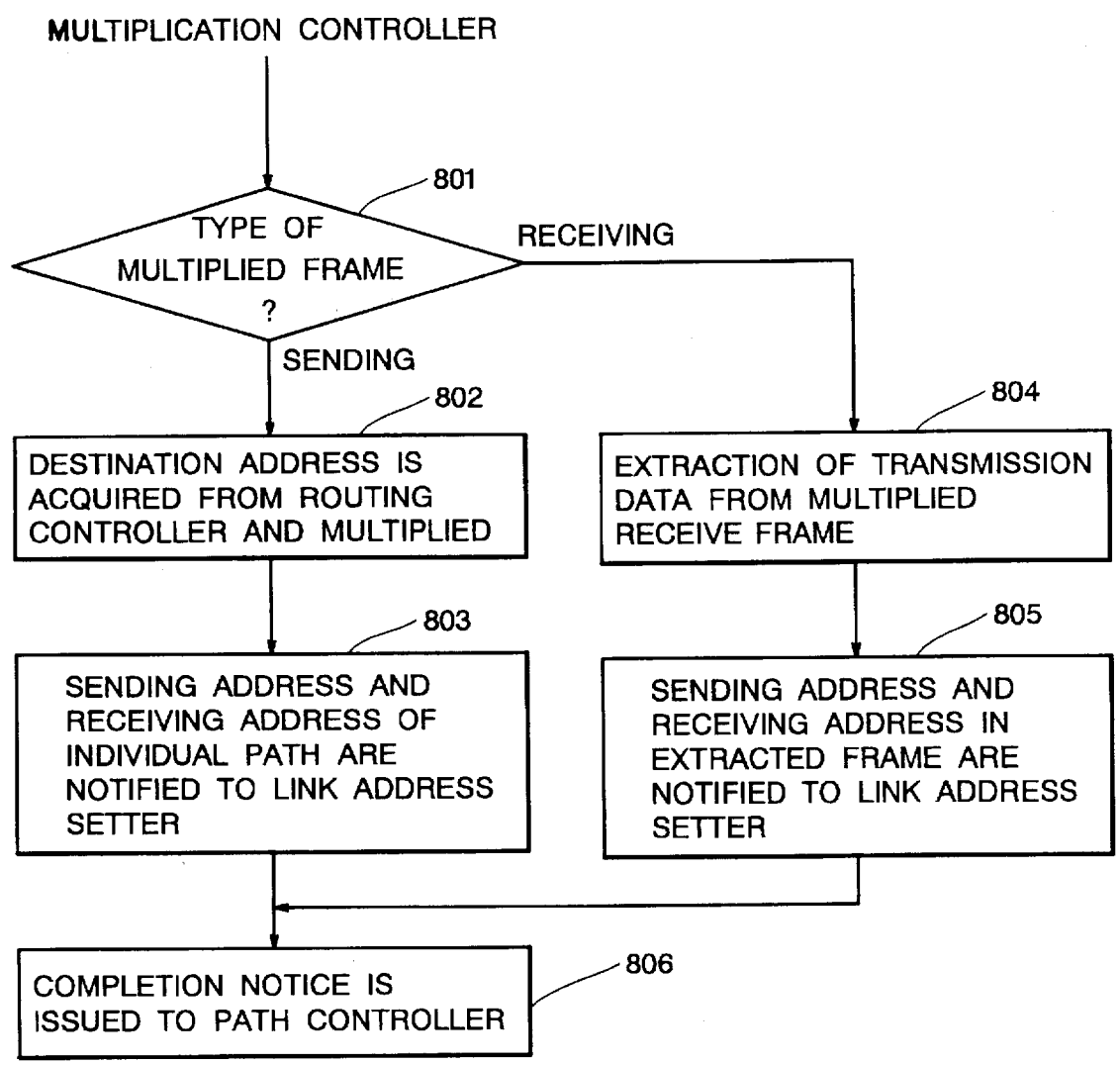
FIG. 8 is a flowchart to illustrate the processing by the multiplication controller.
Figure 9:
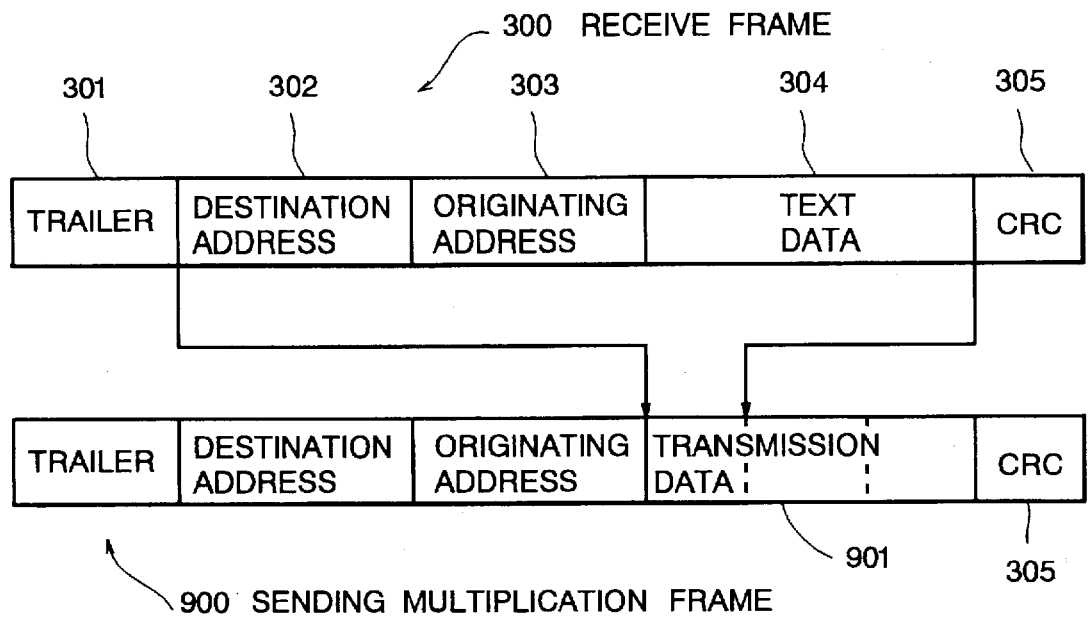
FIG. 9 is an explanatory view to illustrate multiplication of a send frame to make a multiplied send frame.
Figure 10:
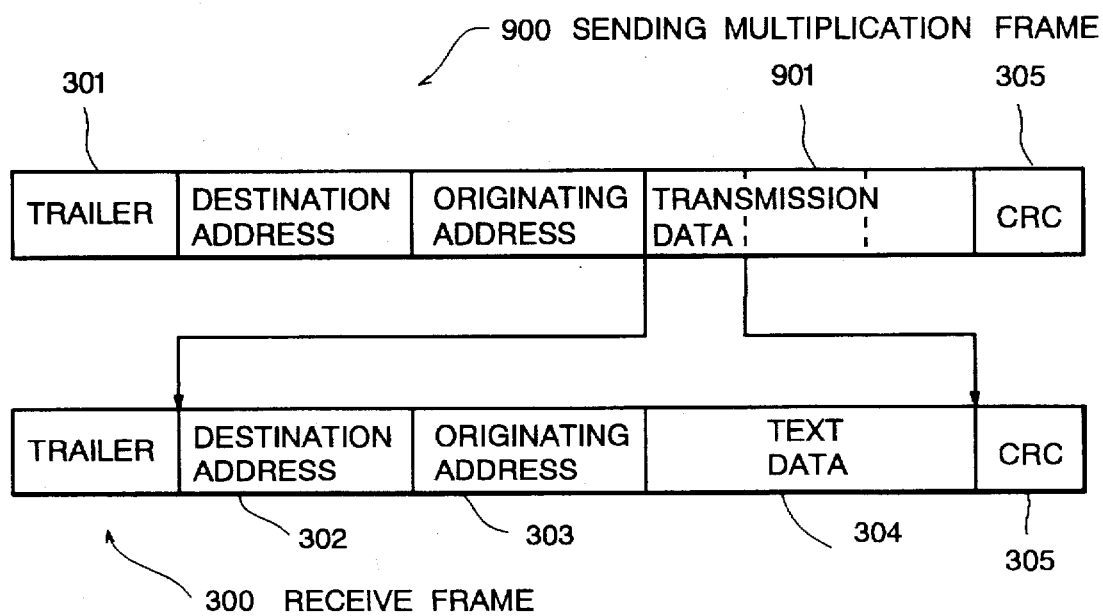
FIG. 10 is an explanatory view to illustrate extraction of a send frame from a multiplied receive frame.

Referring now to FIGS. 8 to 10, the processing at the multiplication controller 106 is explained below. FIG. 8 is a flowchart illustrating the processing by the multiplication controller 106.

Upon receipt of notice from the routing controller 104, the multiplication controller judges whether a multiplied frame is to be sent or received (Step 801). For sending of a multiplied frame, the destination addresses 302, originating addresses 303 and text data 304 in a plurality of received data sent from the routing controller 104 to the buffer are multiplied as shown in FIG. 9 (Step 802). A plurality of destination addresses 302, originating addresses 303 and text data 304 are multiplied so as to obtain transmission data 901. Besides, the destination address m of the individual path, i.e. the address of the router device 10 or 20 to which the transmission is made and the originating address n, which is the address of the current router device 10 or 20, are sent to the link address setter 103 (Step 803).

When notified by the routing controller 104 that a multiplied frame is to be received, the multiplication controller 106 extracts the send frame from the transmission data 901 of the multiplied receive frame as shown in FIG. 10 (Step 804). Then, it notifies the destination address and the source address of the extracted transmission frame to the link address setter 103 and requests for sending of a send frame (Step 805).

Upon completion of the above processing, the completion notice for the individual path in the received or sent multiplied frame is issued to the path controller (Step 806), which terminates the processing by the multiplication controller 106.

Figure 11:
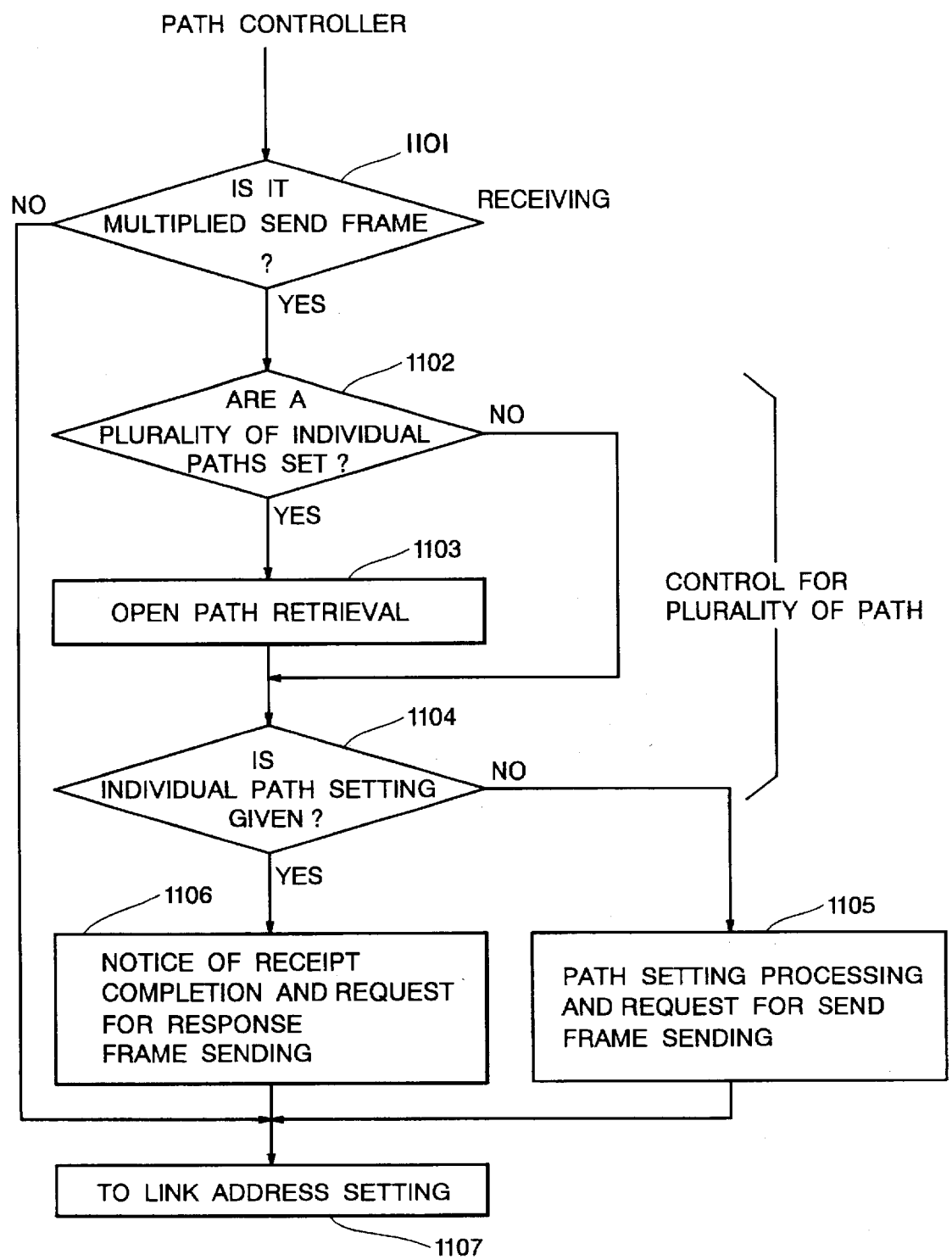
FIG. 11 is a flowchart to illustrate the processing by the path controller.

Referring now to FIG. 11, the path controller 105 is activated by the completion notice from the multiplication controller 106. The paths set at the path controller 105 include logical paths and physical paths. It judges whether the frame to be sent is a multiplied frame (Step 1101). If not, then path controller 105 omits path setting and passes control to the link address setter 103 (Step 1107). If the frame to be sent is a multiplied frame, the path controller judges whether a plurality of individual paths are set (Step 1102). When a plurality of individual paths are set, then the paths currently empty are retrieved so as to determine the path for sending (Step 1103).

Then, the path controller 105 judges whether any individual path is set or not (Step 1104). If not, it sets sending path for the router device 10 or 20 on the other side and requests sending of the multiplied frame to the link address setter 103 (Step 1103). After that, the path controller 105 passes control to the link address setter 103 (Step 1107).

If, in Step 1103, any path is set, then the path controller 105 requests for sending of the multiplied frame to the link address setter 103 upon receipt of receipt completion notice for the previously sent multiplied frame from the router device 10 or 20 on the other side (Step 1106). After that, it passes control to the link address setter 103 (Step 1107).

Figure 12:
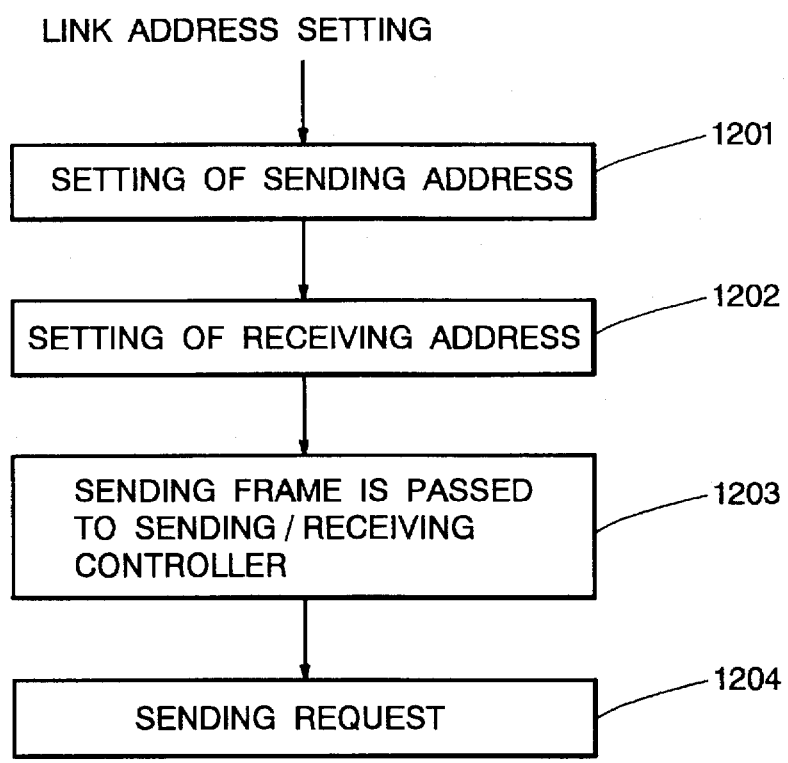
FIG. 12 is a flowchart to illustrate the processing by the link address setting section.

Next, referring to the flowchart of FIG. 12, the processing at the link address setter 13 is described.

Upon receipt of a sending request from the routing controller 104, the link address setter 103 sets again the destination address and the originating address at the time of receipt to the send frame stored in the buffer of the routing controller 104. Upon receipt of a sending request from the path controller 105, it sets again the destination address and the originating address at the time of receipt to the send frame (multiplied frame or send frame extracted from multiplied frame) stored in the buffer of the multiplication controller 106 (Steps 1201 and 1202). When a multiplied frame is to be sent, the destination address is the destination address m of the router device 10 or 20 of the other party of transmission, and the originating address is the originating address n of the current router device 10 or 20.

A send frame with the destination address and the originating address set is transferred to the data sending/receiving controller 100 or 101 (Step 1203), and then sending is requested (Step 1204).

Figure 14:
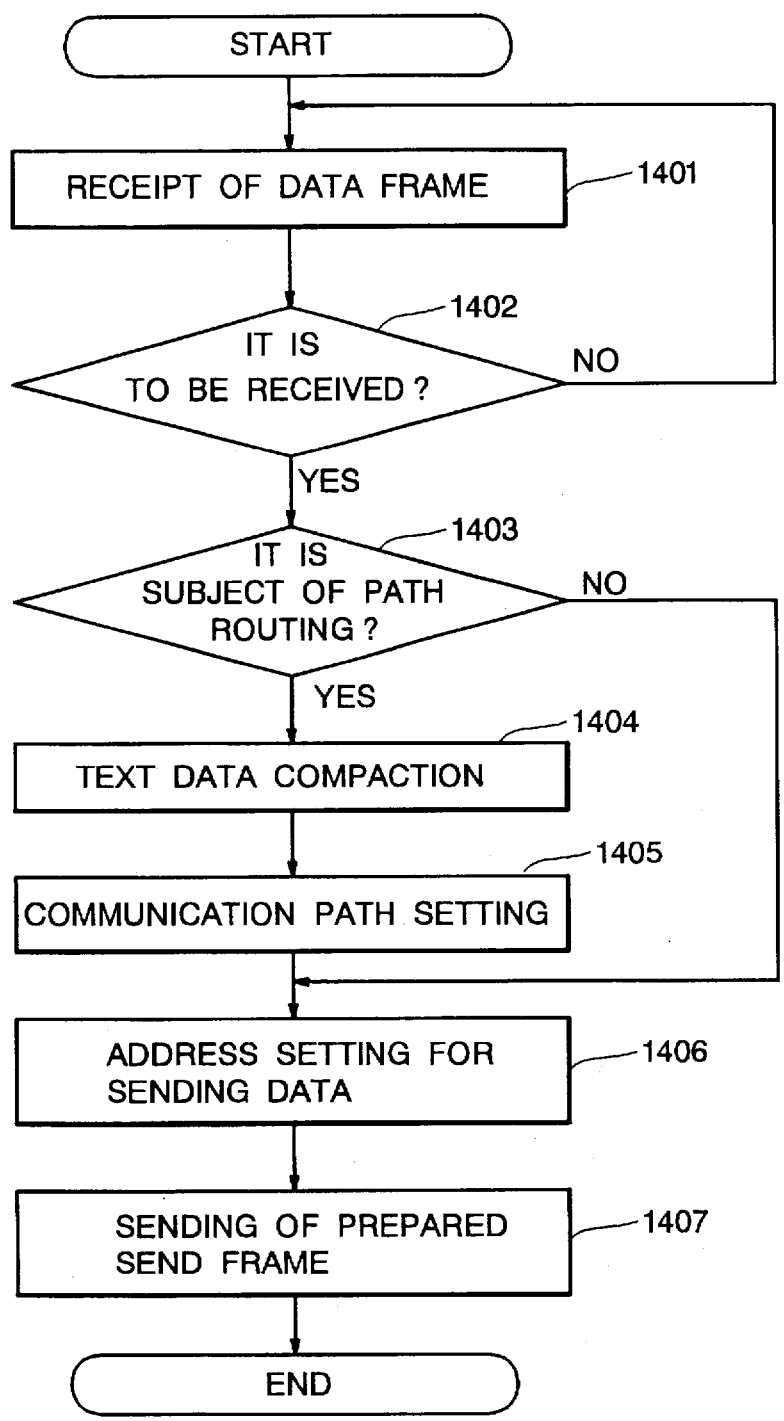
FIG. 14 is a flowchart to illustrate the operation of the entire router device.

Next, referring to FIG. 14, the operation of the entire system of this embodiment is described. For easier understanding, description is focused on the operation of the router device 10 in sending of a frame received by the router device 10.

The data sending/receiving controller 100 or 101 receives a frame from the LAN segment 30 or 40 and stores it to the buffer (Step 1401). Then, the link address detector 102 refers to the address table 107 so as to judge whether the received frame is the subject of receiving or not (Step 1402). If so, the destination address, originating address and data of the frame are read from the buffer in the data sending/receiving controller 100 and 101 for transfer to the routing controller 104. If not, it is directed to the data sending/receiving controller to destroy the received frame.

The frame transferred to the routing controller 104 as the subject of receiving is stored in the buffer of the routing controller 104. The routing controller 104, by referring to the routing address table 108, judges whether the transferred frame is the subject of path routing or not (Step 1403). If the frame is the subject of path routing, it is transferred to the multiplication controller 106. If not, the frame is sent to the link address setter 103.

Frames transferred to the multiplication controller 106 as the subject of path routing are sequentially stored to a plurality of buffers in the multiplication controller 106 and their text data, destination addresses and originating addresses are compacted through concatenation (Step 1404). The number of frames accumulated in the multiplication controller 106 is the same as that of the frames accumulated by the multiplication controller 106 during previous processing. If the accumulated frame is only one and it is impossible to make concatenation with other frames, the processing flow is the same. It is needless to wait for two or more frames to be accumulated. Therefore, no delay is occurred due to waiting for accumulation of two or more frames.

Next, the path controller 105 sets the transmission paths for the other party router device 20 (Step 1405). A single path or a plurality of paths may be set corresponding to the amount of information contained in the multiplied frame to be transmitted. The link address setter 103 sets a destination address and an originating address to the multiplied frame sent from the multiplication controller 106 or the frame transferred without multiplication from the routing controller 104 so as to create a new frame (Step 1406). The data sending/receiving controller 100 or 101 receives this newly created frame and sends it to the LAN segment 30 or 40.

Referring now to FIGS. 15 to 20, the flow of data signals in this embodiment is described below.

Figure 15:
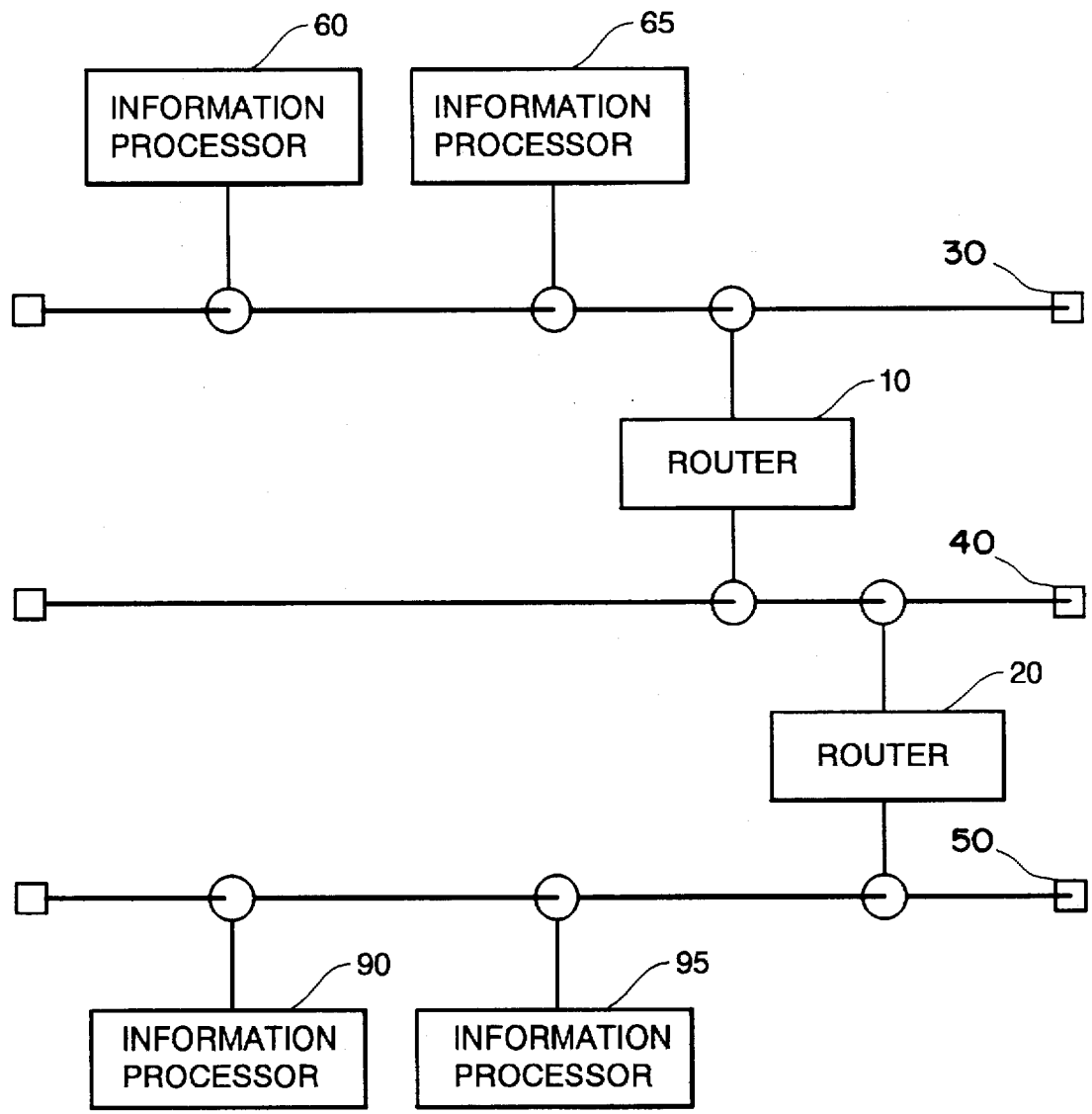
FIG. 15 is a diagram to show another configuration example of a data communication system.
Figure 16:
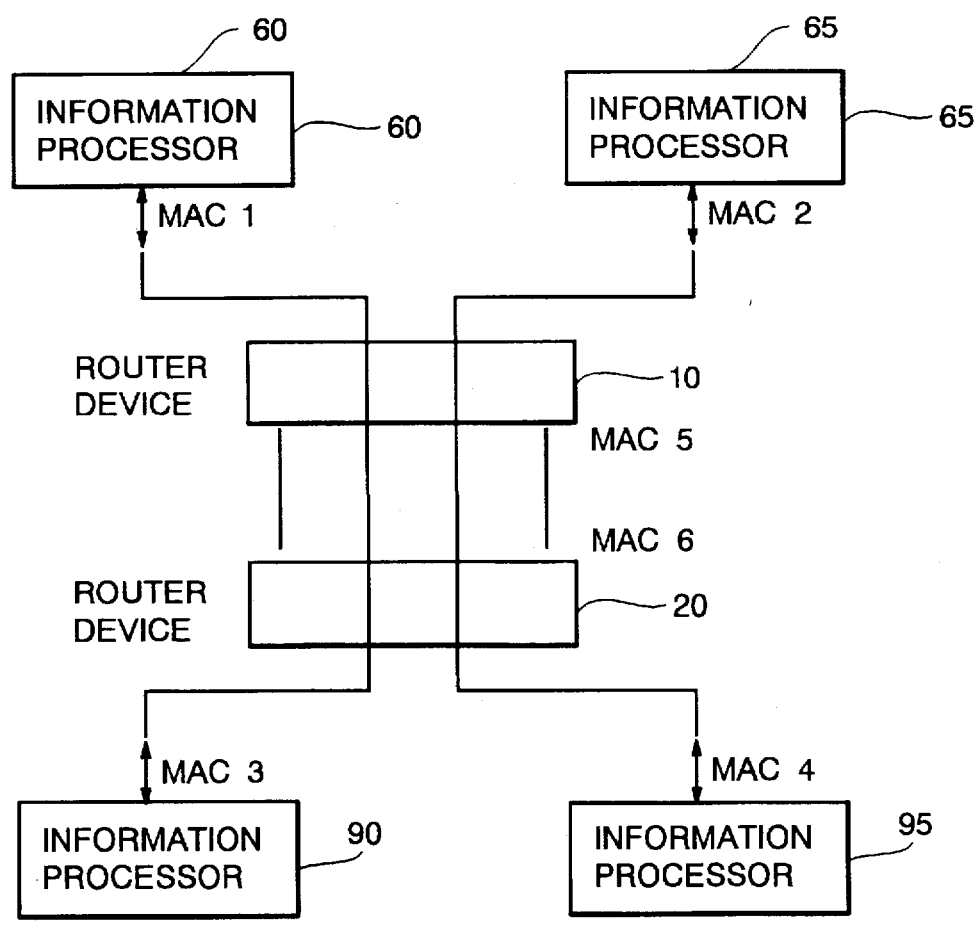
FIG. 16 is an explanatory view to illustrate the addresses of the devices in the data communication system of FIG. 15.

FIG. 15 shows a data communication system provided with LAN segments 30, 40 and 50 mutually connected by router devices 10 and 20 with the LAN segment 30 connected with the information processors 60 and 65 and the LAN segment 50 connected with the information processors 90 and 95. Suppose now that, as shown in FIG. 16, communications are made between the information processors 60 and 65 and the information processors 90 and 95 via the router devices 10 and 20 in the data communication system as shown in FIG. 15. Here, the address (origination address for a send frame and destination address for a receive frame) of the information processor 60 is set to be MAC1, the address of the information processor 65 is set to be MAC2, the address of the information processor 90 is set to be MAC3, the address of the information processor 95 is set to be MAC4, the address of the router device 10 is set to be MAC5, the address of the router device 20 is set to be MAC6.

Figure 17:
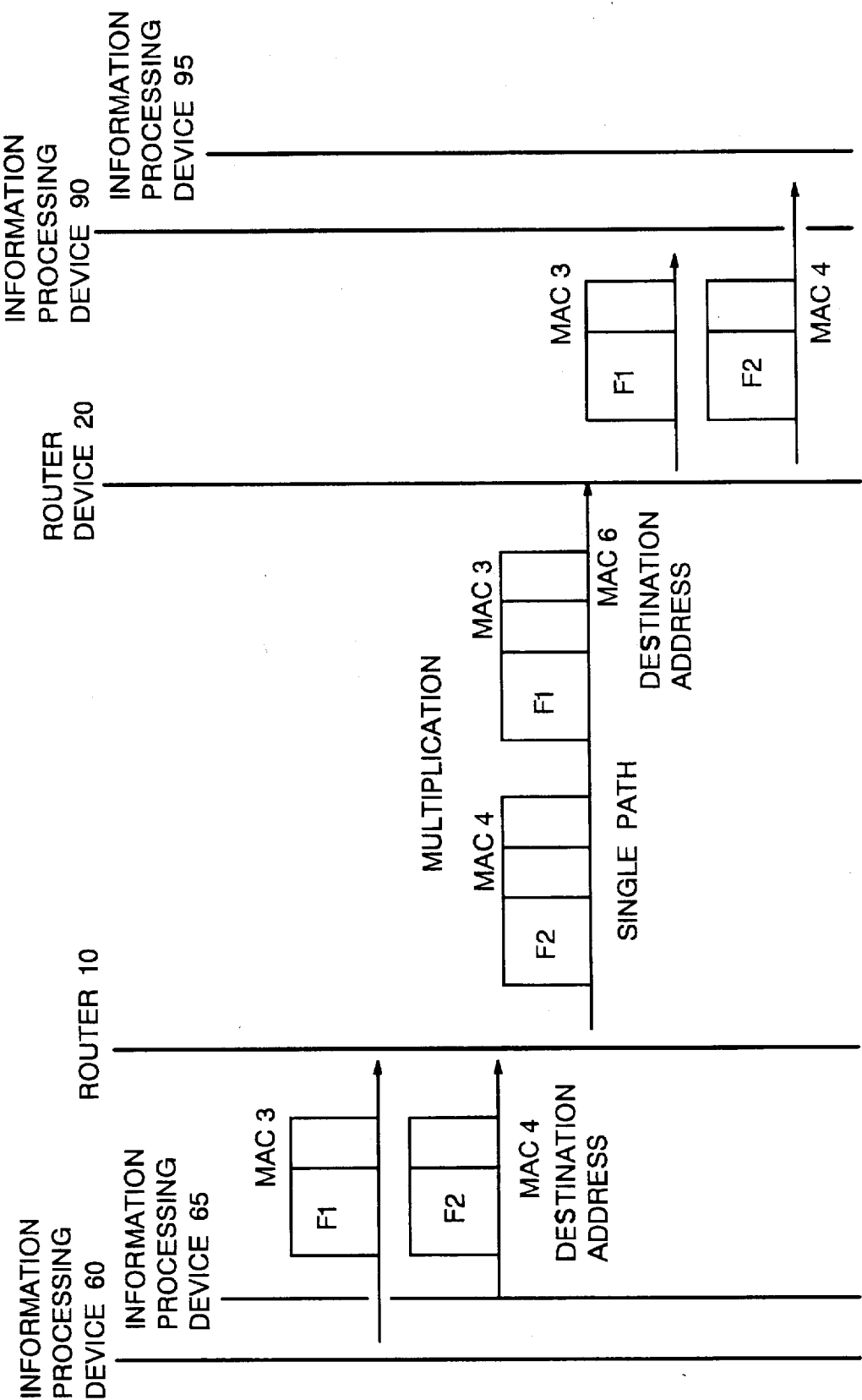
FIG. 17 is a logic chart to illustrate the flow of frames in communications using a single path in the data communication system of FIG. 15.
Figure 18:
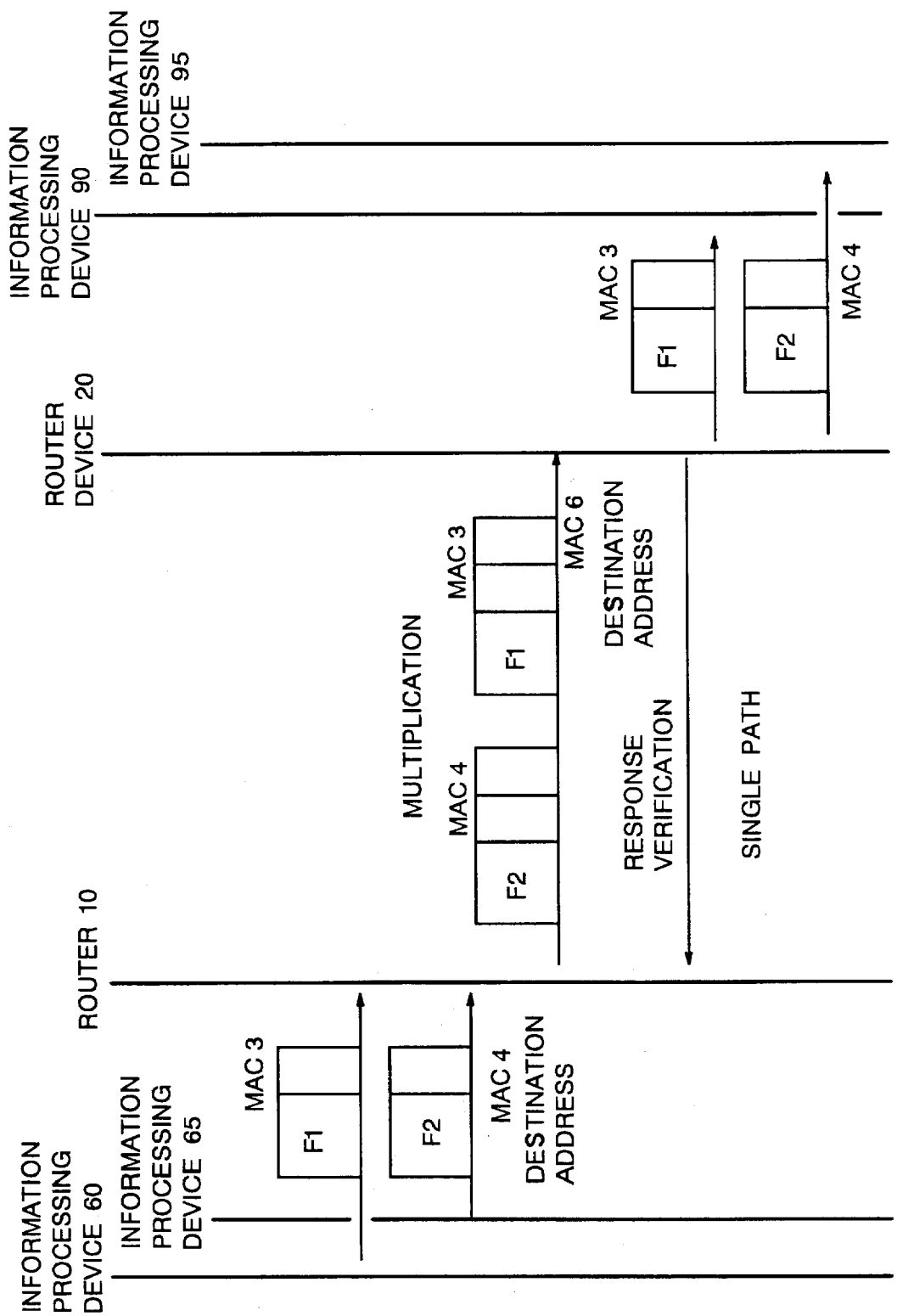
FIG. 18 is a logic chart to illustrate the response verification in the single path communications of FIG. 17.

FIG. 17 shows a logic chart to illustrate the single path transmission of frame F1 from the information processor 60 to the information processor 90 and of frame F2 from the information processor 65 to the information processor 95. In FIG. 17, via a single path set between the router devices 10 and 20, a multiplied frame obtained by multiplication of the frames F1 and F2 is sent. This multiplication frame has the destination address m of MAC6 and the origination address n of MAC5.

FIG. 18 is a logical chart again for single path transmission similar to the case of FIG. 17 when response control is made between the router devices 10 and 20. In this case, the router device 20 which received the multiplied frame sends the response verification to the router device 10.

Figure 19:
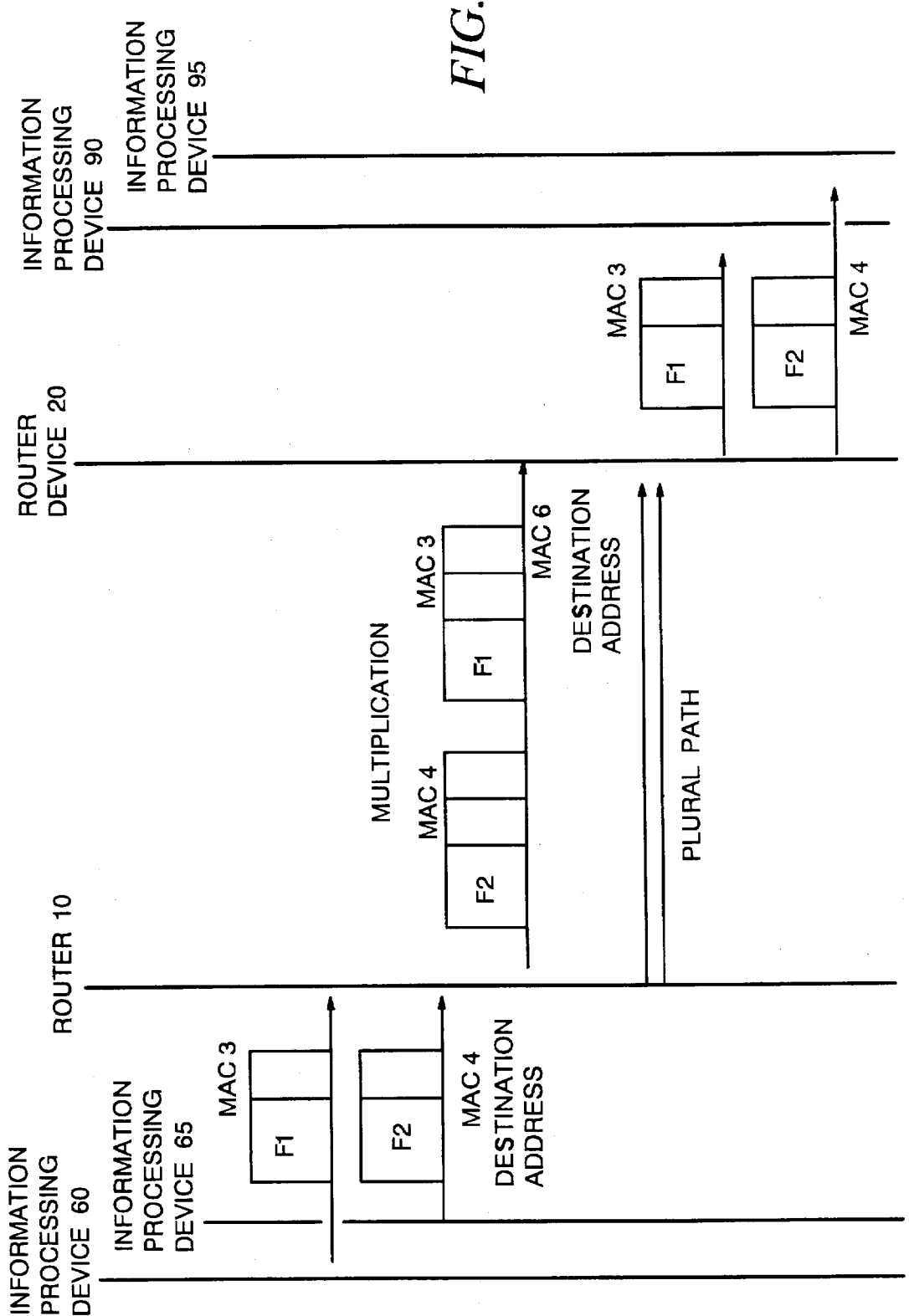
FIG. 19 is a logic chart to illustrate the flow of frames in communications using a plurality of paths in the data communication system of FIG. 15.
Figure 20:
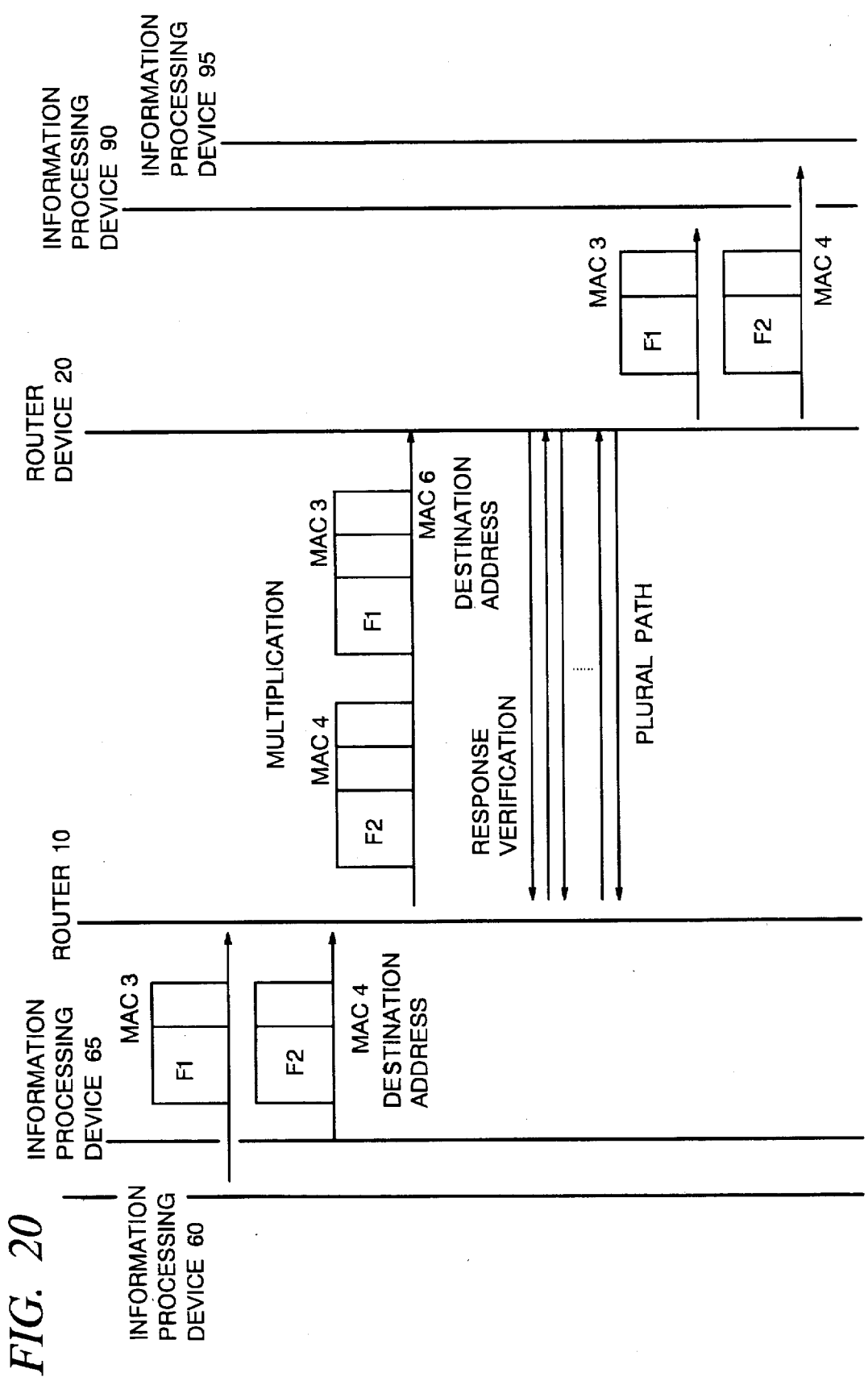
FIG. 20 is a logic chart to illustrate the response verification in the plural path communication of FIG. 19.

FIG. 19 is a logic chart to illustrate plural path transmission of frame F1 from the information processor 60 to the information processor 90 and of frame F2 from the information processor 65 to the information processor 95. FIG. 20 also shows a chart of plural path transmission similar to the case of FIG. 19 when response controls are made between the router devices 10 and 20 for each of the plurality of individual paths set there. If frames other than the frames F1 and F2 are sequentially sent, then those frames are also transmitted after multiplication.

Thus, when the router devices 10 and 20 set individual paths in order for mutual communications between the terminating LAN segments 30 and 50, multiplication of frames to be sent enables reduction of traffic at the LAN segment 40 at the relay position.

In addition, by setting a plurality of individual paths between the routers 10 and 20 corresponding to the amount of communications, the communication amount at each path can be increased or decreased. Besides, response verification for each individual path enables control of frame transmission corresponding to the loading status of the router devices 10 and 20 as well as the loading status of the LAN segments 30 to 50. This enables communications between the information processors 60 and 90 without lowering the efficiency of the entire data communication system.

Obviously many modifications and variations of the present invention are possible. It is intended to cover in the appended claims all such modifications as fall within the true spirit and scope of the invention.

What is claimed is:

1. A router device connected between a plurality of LAN segments for mutual communications between processing devices on said LAN segments, comprising:

a plurality of data sending/receiving control means each for receiving data signals from a corresponding one of said LAN segments and for sending data signals to said corresponding one of said LAN segments;

a link address detection means for selecting data signals that are to be received and sent out by the router device among the data signals received at said plurality of data sending/receiving control means;

a routing control means for selecting data signals that are to be routed through another router device from the data signals selected by said link address detection means;

a concatenation control means for concatenating the data signals selected by said routing control means as a single concatenated data signal which is output from the router device as a single frame of data having a single destination address and a single originating address as header information, the single originating address corresponding to an address of the router device, the single, destination address corresponding to an address of the another router device, the concatentation control means concatenating a plurality of text data from a corresponding plurality of frames of data destined for processing devices that can only be communicated with via the another router device, the concatenating text data corresponding to a single text data field of the single concatenated data signal;

a path control means for setting paths for the data signals concatenated by said concatenation control means and for issuing a request to send out said single concatenated data signal; and a link address setting means, based on the issued request from said path control means, for setting a destination address to said single concatenated data signal to send said single concatenated data signal to one of said plurality of data sending/receiving control means to be thereby sent to the another router device.

2. A router device of claim 1, further comprising:

an address table, wherein destination addresses and originating addresses of the data signals to be received are stored therein, wherein said link address detection means selects the data signals that are to be received and sent out by the router device from the received data signals by referring to the originating addresses and destination addresses stored in said address table, and wherein the routine control means selects the data signals that are to be routed through the another router device from the data signals selected by said link address detection means and that are to be concatenated by the concatenation control means by determining whether or not the corresponding destination addressees of the received data signals match devices that can be communicated with using only the another router device.

3. A router device of claim 2, further comprising:

a routing address table, wherein destination addresses and originating addresses of the data signals to be concatenated as said single concatenated data signal and transmitted out to the another router device are stored in said routing address table, and wherein said routing control means selects the data signals to be sent out to the another router device by referring to the originating addresses and destination addresses stored said routing address table.

4. A router device of claim 1 wherein said routing control means comprises a means, which, after said routing control means judges whether a destination address of a data signal other than those to be routed matches with its own address, notifies said concatenation control means that the data signal has been concatenated in case of matching and issues a sending request to said link address setting means in case of unmatching, and said concatenation control means comprises a means which, upon receipt of notice from said routing control means for a concatenated data signal, extracts the original data signals from said concatenated data signal and issues to said link address setting means a sending request for the extracted data signals.

5. A router device of claim 1 wherein said path control means comprises a means to set a single path or a plurality of paths corresponding to an amount of data signals concatenated in said concatenated data signal.

6. A router device of claim 1, wherein the concatenation control means also performs deconcatenation of a received concatenation data signal sent from the another router device, and wherein the received concatenation data signal is detected by having a corresponding destination address that corresponds to the router device.

7. A router device of claim 6, wherein the router device performs the deconcatenation of the received concatenation data signal by converting the received concatenation data signal into a plurality of normal data frames each having a destination address corresponding to a non-router device directly connected with the router device via one of said plurality of LAN segments.

8. A data communication system for allowing communications between processing devices, comprising:

at least three LAN segments; and a router device connected between said at least three LAN segments for mutual communications among said at least three LAN segments;

wherein said router device includes a plurality of data sending/receiving control means each for receiving data signals from a corresponding one of said at least three LAN segments and for sending data signals to said corresponding LAN segment;

a link address detection means for selecting data signals that are to be received and sent out by said router device among the data signals received at said plurality of data sending/receiving control means;

a routing control means for selecting data signals that are to be routed through another router device from the data signals selected by said link address detection means;

a concatenation control means for concatenating the data signals selected by said routing control means as a single concatenated data signal which is output from the router device as a single frame of data having a single destination address and a single originating address as header information, the single originating address corresponding to an address of the router device, the single destination address corresponding to an address of the another router device, the concentration control means concatenating a plurality of text data from a corresponding plurality of frames of data destined for processing devices that can only be communicated with via the another router device, the concatenating text data corresponding to a single text data field of the single concatenated data signal;

a path control means for setting paths for the data signals concatenated by said concatenation control means and for issuing a request to send out said single concatenated data signal; and a link address setting means, based on the issued request from said path control means, for setting a destination address to said single concatenated data signal to send said single concatenated data signal to one of said plurality of data sending/receiving control means to be thereby sent to said another router device.

9. A data communication system of claim 8, further comprising:

an address table, wherein destination addresses and originating addresses of the data signals to be received are stored therein, wherein said link address detection means selects the data signals that are to be received and sent out by the router device from the received data signals by referring to the originating addresses and destination addresses stored in said address table, and wherein the routing control means selects the data signals that are to be routed through the another router device from the data signals selected by said link address detection means and that are to be concatenated by the concatenation control means by determining whether or not the corresponding destination addressees of the received data signals match processing devices that can be communicated with using only the another router device.

10. A data communication system of claim 9, further comprising;

a routing address table, wherein destination addresses and originating addresses of the data signals to be concatenated as the single concatenated data signal and transmitted out to the another router device are stored in said routing address table, and wherein said routing control means selects the data signals to be sent out to said another router device by referring to the originating addresses and destination addresses stored in said routing address table.

11. A data communication system of claim 8 wherein said routing control means comprises a means, which, after said routing control means judges whether a destination address of a data signal other than those to be routed matches with its own address, notifies said concatenation control means that the data signal has been concatenated in case of matching and issues a sending request to said link address setting means in case of unmatching, and said concatenation control means comprises a means which, upon receipt of notice from said routing control means for a concatenated data signal, extracts the original data signals from said concatenated data signal and issues to said link address setting means a sending request for the extracted data signals.

12. A data communication system of claim 8 wherein said path control means comprises a means to set a single path or a plurality of paths corresponding to an amount of data signals concatenated in said concatenated data signal.

13. A data communication system of claim 8, wherein the concatenation control means also performs deconcatenation of a received concatenation data signal sent from the another router device, and wherein the received concatenation data signal is detected by having a corresponding destination address that corresponds to the router device.

14. A data communication system of claim 13, wherein the router device performs the deconcatenation of the received concatenation data signal by converting the received concatenation data signal into a plurality of normal data frames each having a destination address corresponding to a non-router device directly connected with the router device via one of said plurality of LAN segments.

15. An apparatus for sending data between a first, second and third LAN segment for mutual communications between said first, second and third LAN segments, comprising:

a first router connecting said first LAN segment to said second LAN segment; and a second router connecting said second LAN segment to said third LAN segment;

wherein each of said first and second routers includes:

data sending/receiving control means for receiving data signals from each of said LAN segments connected to said corresponding first and second router and for sending data to said LAN segments connected to said corresponding first and second router, each of said data signals including an origination address, a destination address, and text data;

link address detection means for determining if said origination address and said destination address of each of said data signals received by said data sending/receiving control means on one of said first, second and third LAN segments connected thereto need to be sent out on another of said first, second and third LAN segments connected thereto;

routing control means for determining if said origination address and said destination address of each of said data signals that are received on one of said first, second and third LAN segments and that need to be sent out on another of said first, second and third LAN segments have to go through the other one of said routers to get to said another of said first, second and third LAN segments;

concatenation means for concatenating text data of each of the data signals that have to go through the other one of said routers as concatenated data frame, the concatenated data frame being output from the corresponding router with a single destination address and a single origination address as header information, the single origination address corresponding to an address of the corresponding one of said routers, the single destination address corresponding to an address of the other one of said routers, the concatetation control means concatenating a plurality of text data from a corresponding plurality of normal frames of data destined for devices that can only be communicated with via the other one of said routers, the concatenating text data corresponding to a single text data field of the concatenated data frame; and path control means for adding a destination address corresponding to the other one of said routers and an origination address corresponding to the corresponding router with the concatenated text data to be sent out by the data sending/receiving control means as a concatenated data signal, said path control means providing the single destination address and the single origination address for the concatenated data frame, and wherein said concatenated data signal includes said each of said data signals that are sent from one of said first and third LAN segments to an other one of said first and third LAN segments by passing through both said first and second routers.

16. An apparatus of claim 15, wherein the concatenation means also performs deconcatenation of a received concatenation data frame sent from the other one of said routers, and wherein the received concatenation data frame is detected by having a corresponding destination address that corresponds to the corresponding one of said routers.

17. An apparatus of claim 16, wherein the concatenation means performs the deconcatenation of the received concatenation data frame by converting the received concatenation data frame into a plurality of normal data frames each having a destination address corresponding to a non-router device directly connected with the corresponding one of said routers via one of said LAN segments.

* * * * *